J. F. GAIL & O. RUDD.
PROCESS AND APPARATUS FOR MAKING METAL TUBES.
APPLICATION FILED MAY 1, 1915.
1,172,700.
Patented Feb. 22, 1916.
3 SHEETS—SHEET 1.
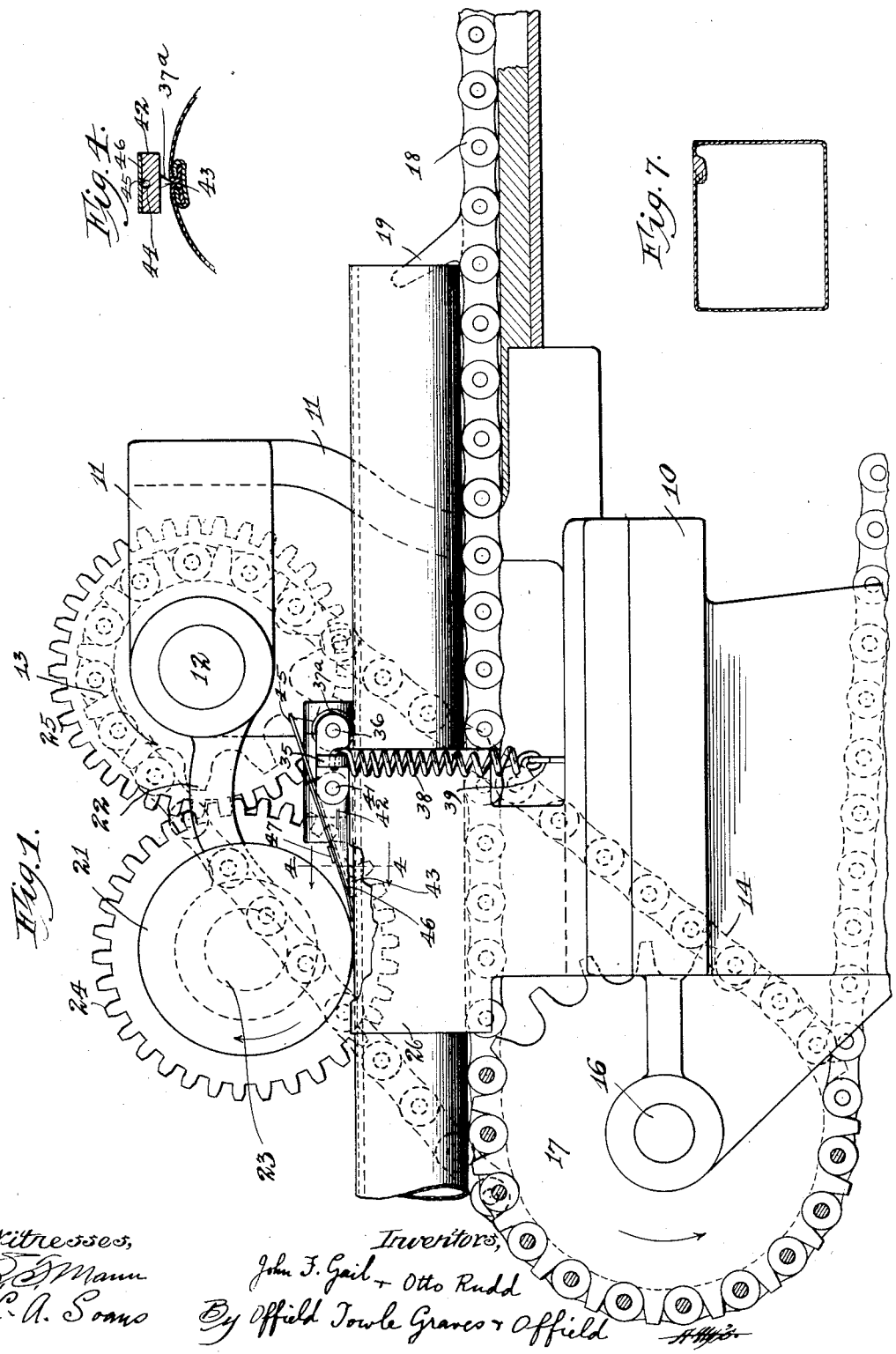

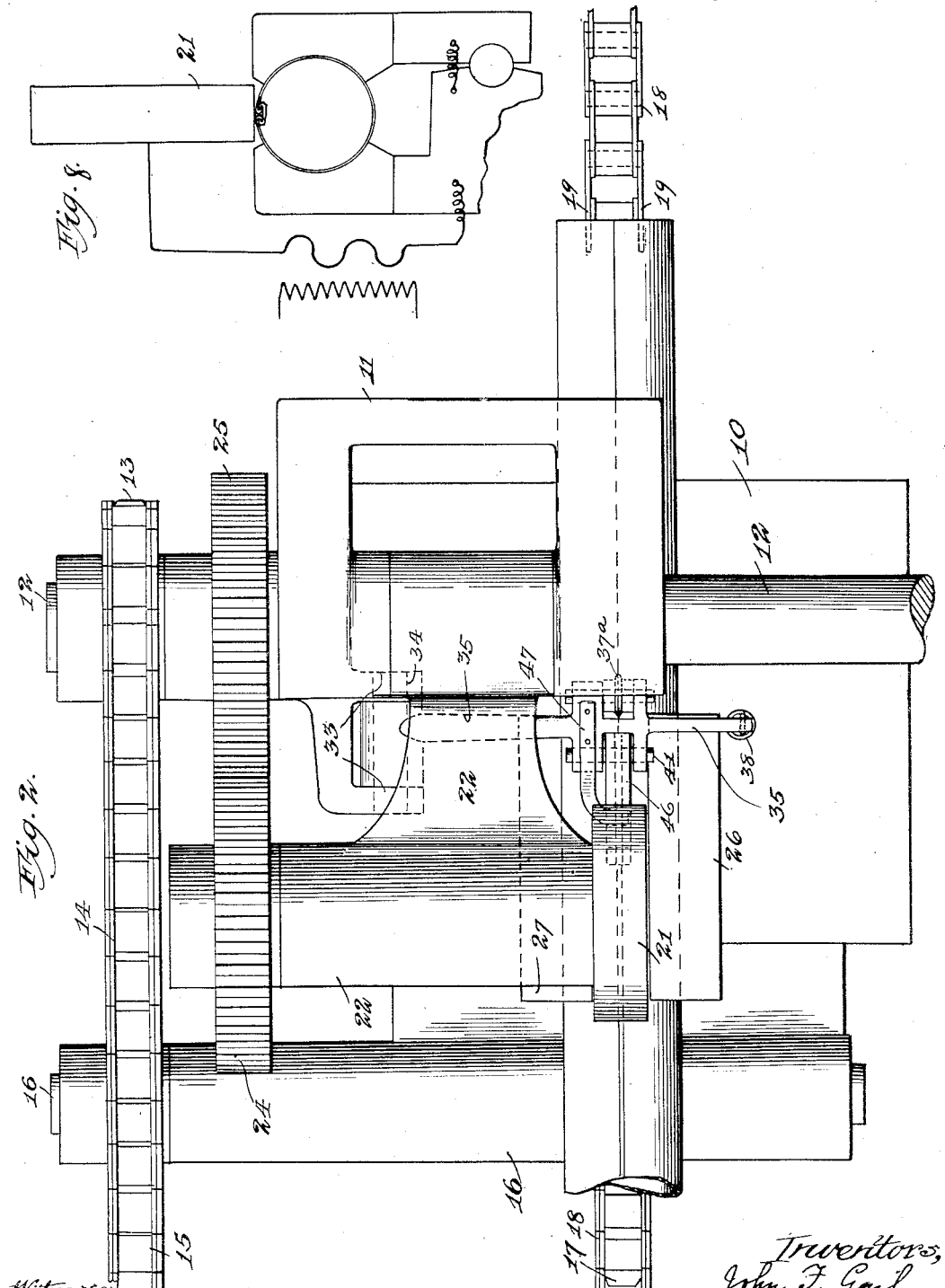

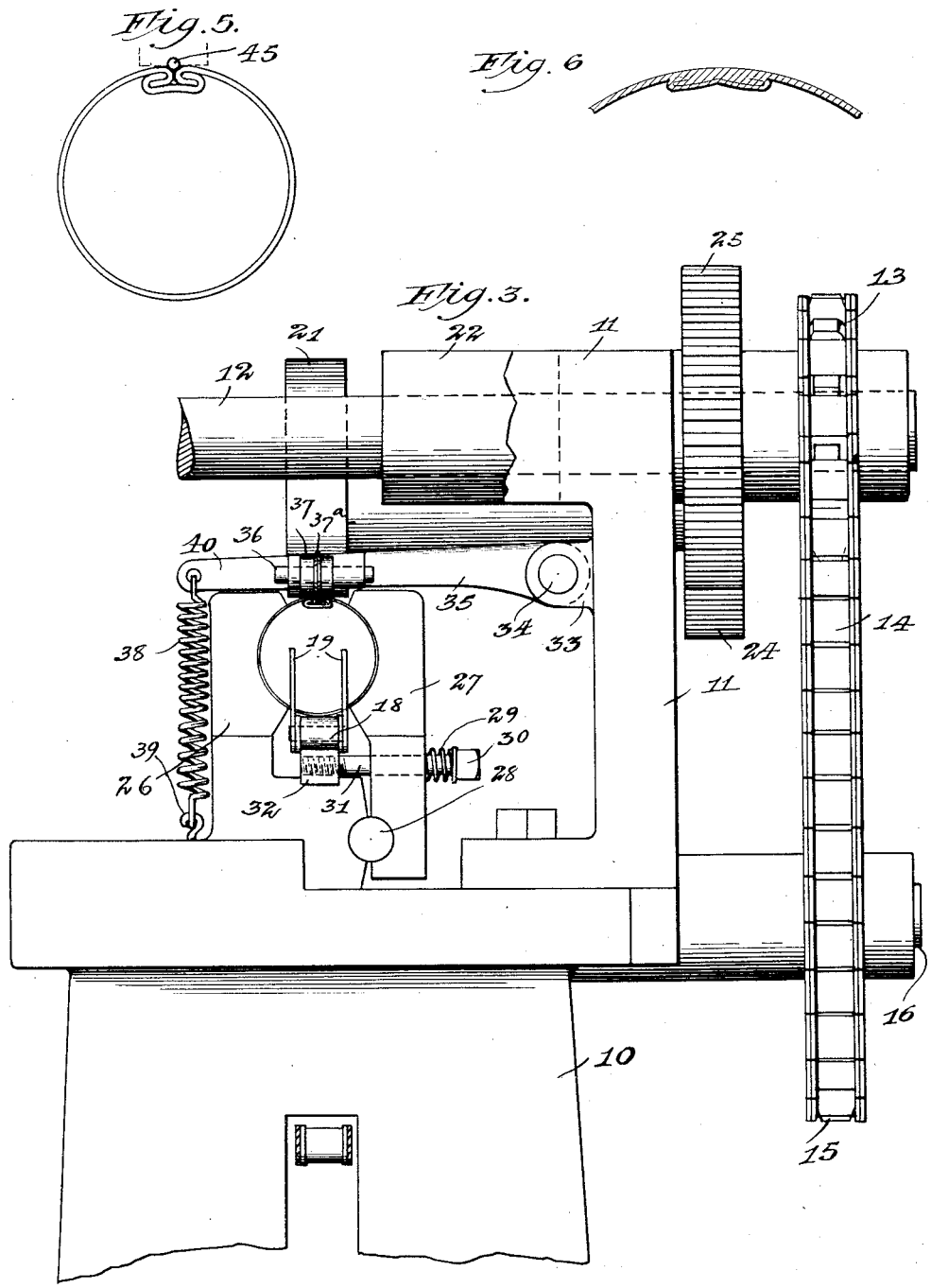

UNITED STATES PATENT OFFICE.

JOHN F. GAIL AND OTTO RUDD, OF KENOSHA, WISCONSIN, ASSIGNORS TO THE SIMMONS MANUFACTURING COMPANY, OF KENOSHA, WISCONSIN, A CORPORATION OF WISCONSIN.

PROCESS AND APPARATUS FOR MAKING METAL TUBES.

1,172,700. Specification of Letters Patent. Patented Feb. 22, 1916.

Application filed May 1, 1915. Serial No. 25,325.

*To all whom it may concern:*

Be it known that we, JOHN F. GAIL and OTTO RUDD, both citizens of the United States, residing in the city of Kenosha, county of Kenosha, and State of Wisconsin, have invented certain new and useful Improvements in Processes and Apparatus for Making Metal Tubes, of which the following is a specification.

Our invention pertains to thin-walled tubing of steel or other metal formed from strip sheet metal stock having its edges united by a seam formed of plural thicknesses or plies of metal. According to this invention the external longitudinal seam-cleft of tubes thus formed is closed by a process of autogenous welding in such manner as to produce a tube which is externally seamless, and the tube wall of which is circumferentially continuous and homogeneous in structure.

In the preferred embodiment of the invention the closing of the external cleft is accomplished by electric welding. The metal serving to close the cleft is, according to the invention described in the present specification, derived wholly or in part from a fillet, strip or wire of the same or essentially similar metal. The closure is however autogenous in character, and the finished tube wall is essentially homogeneous in structure.

In the practice of our invention we employ electric welding as the final or perfecting step of our improved process. Seamed tubing electrically welded is not new. Heretofore it has been common to butt weld the edges of relatively thick-walled tubing blanks to close the seam of the tube. It has also been proposed to modify the butt welding method by interposing and welding an inset section of metal between the edges of the tube blank proper, this section becoming an inset strip in the finished tube.

Attempts to electrically butt weld thin gage tubing have, so far as we are advised, been practical failures, and it is not to be had as a commercial article.

Among the chief difficulties of welding very thin stock into tubing are the difficulty of keeping the softened (usually fused) edges which are to be joined in proper register with each other; the prevention of the dispersion of the melted metal so that the making of a good joint is impossible; the prevention of the fused metal adhering to the devices used for supporting and confining the edges to be joined; and the overheating and burning of the metal.

The objects of the present invention are to overcome these and other difficulties, and to provide a way of making good externally seamless tubing from thin stock of steel or other metal, at a rapid rate and low cost.

The invention will be readily understood from the following description, reference being had to the accompanying drawings, in which—

Figure 1 is a side elevation of a preferred apparatus for effecting the welding step of our process; Fig. 2 is a plan view of the parts shown in Fig. 1; Fig. 3 is an end elevation looking from the right-hand side of Fig. 1; Fig. 4 is a cross-sectional view showing a fragment of tubing, a part of the fillet, guide and the blade of a centering device, in their proper relations; Fig. 5 is an end elevation of a section of the tubing before being welded, with the fillet in position preparatory to welding; the contacting relation of the electrode with the fillet being indicated in dotted lines; Fig. 6 is a diagrammatic fragmentary cross sectional view of that portion of a piece of tubing containing the finished seam; Fig. 7 is a diagrammatic cross sectional view of a piece of rectangular tubing, illustrating our process. Fig. 8 is a view showing the relations of the electrodes to the tubing and the electric circuit connections, the latter being shown diagrammatically.

In said drawings, 10 is the base casting of the machine, on the top of which is secured a bracket 11 in which is journaled a main drive shaft 12, which is positively rotated from any convenient source of power. Said shaft carries a sprocket pinion 13 keyed thereto, which is connected by means of a chain 14 to another sprocket wheel 15 keyed on a shaft 16 which is journaled in the left-hand side of the upper part of the base casting. On said shaft 16 there is secured a conveyer chain sprocket 17 which drives an endless conveyer chain 18, which extends to the left of the main casting a sufficient distance to accommodate the greatest length of tube the machine is designed to handle. It is to be understood that the farther end of said conveyer chain is trained around a suitably supported idler sprocket similar to the sprocket 17. At suitable intervals on the conveyer chain spurs or dogs 19 are provided which project forwardly and outwardly, so as to engage the rear end of a tube section and propel it along.

In making tubing we prefer to use lock seam tubing, the seam whereof is of the construction shown in Figs. 5 and 6; such tubing being like that shown in the patent to Wilmot No. 625,946, except that the so-called "metal packing" described in that patent is dispensed with. But other suitable forms of lock seam tubing may be utilized, one such modification being shown in Fig. 7 of the drawings, which, as will be seen, is lock seamed together by what is commonly known as a stovepipe seam joint.

We also prefer to form up the blank and make the mechanically interlocked seam by means of a separate machine or apparatus, although it should be understood that such apparatus for forming the tubing and interlocking the edges mechanically may be combined into one machine with the welding apparatus whereby the welding step of our process is carried into effect.

The welding step is accomplished by feeding a length of tubing carried by the conveyer chain through a two-part welding shoe 26, 27, with which coöperates a welding roll 21. Said welding roll is positively driven so that its perimeter which rolls upon the tube traverses at the same, or substantially the same, linear surface speed as the linear speed of the tube which is being welded. To this end we pivot upon the same axis as the shaft 12 a swinging arm 22, the outer end of which constitutes the journal for the welding roll shaft 23. Shafts 23 and 12 are operatively connected by means of spur gears 24, 25, the pitch diameter of which are suitably proportioned relatively to the speed of the sprocket wheels 15 and 13 which produce the described peripheral speed of the welding roll. Said welding roll is formed of copper, bronze or other suitable material having high conductivity and is suitably insulated from its support or the main machine so that short circuiting of the current through the gears or shafts is avoided. The current may be conveyed to the roll 21 by any approved sliding contact or brush device. The necessary contact pressure between the face of the roll and the surface of the tube is in the present instance provided by the weight of the pivoted parts, but this may be augmented by a spring if so desired.

The two-part welding shoe has one of its parts 26 stationary, and the other, 27, movable. Said part 27 to this end is pivoted upon the shaft 28, which latter fits in grooves formed in the opposed faces of the lower extensions of the two welding shoe parts 26 and 27 (see Fig. 3). The movable part is forced toward its mating half by means of a spring 29 interposed between the outer face of part 27 and the head 30 of the end of the stud or tap bolt 31, which is threaded into the side of the conveyer chain track 32. Said track is at this point rigidly mounted on the lower extension of the fixed welding shoe part 26. The parts 26 and 27 are also constructed of metal of high conductivity and are connected to the pole of the welding transformer other than the one with which contact roll 21 is connected.

The opposed inner surfaces of the welding shoe parts 26 and 27 are suitably grooved to fit and embrace that size and form of tube which is to be operated upon, and thus while acting as electrodes they embrace and support the tube, prevent it from being distorted, and accurately guide it while it is passing under the welding roll.

Describing the mechanism for centering the seam of the tube and for feeding the fillet of metal into the seam cleft or joint, on the bracket 11 are cast parallel lugs 33 (see Fig. 3) between which is pivoted an insulated arm 35. In the intermediate part of this arm there is secured an insulated shaft 36, upon which rotates freely a small centering roll 37, in the middle of the circumference of which is formed a knife-like centering rib or bead 37$^a$ which is adapted to enter the cleft between the folded edges of the lock seam in the tube, and thus center said seam relatively to the welding roll. Said centering roll is held down to its work by a tension spring 38, which is secured to an insulated pin or eye 39 mounted in the frame of the machine, the other end of the spring engaging the end 40 of the arm 35. In the same arm 35, between the centering roll 37 and the welding roll, is mounted a second insulated shaft 41, upon which is pivoted a finger 42 which extends toward the welding roll. At its forward end said finger has a knife-like centering rib 43 (see particularly Fig. 1) analogous in function to the centering rib 37$^a$ on the centering roll, and in action supplementing the latter.

The upper side of the finger 42 is longitudinally grooved, as indicated at 44, sufficiently to receive and guide the fillet of wire 45 into position in the cleft of the seam close to the contacting face of the welding roll. The fillet is held in the guiding groove 44 and pressed into bearing with the cleft of the seam by means of a thin plate 46 secured to the top of the finger and extending beyond the latter. Pressure upon the plate and finger is supplied by a flat insulated spring 47 mounted on the arm 35 (see particularly Fig. 2).

The welding operation is as follows: A length of tubing having been placed on the conveyer chain with its end entering the welding shoe and its rear end engaged by the dogs or spurs 19, and with its seam at the top and the cleft thereof engaged by the guiding roll 37ª, and with a fillet of wire 45 adjusted in the guiding finger and started beneath the welding roll, the machine is ready to start, and simultaneously current is turned on and supplied to the welding roll 21 from one side of the circuit, returning through the parts of the shoe 26 and 27 on the other side of the circuit. The circuit connections are shown diagrammatically in Fig. 8, as are also the relations of the several electrodes to the tubing and the fillet at the time of welding. By reason of the fact that the welding shoe rides upon the fillet 45, the current passing through the welding roll enters the tubing over a very small localized area; the current passing first laterally through the fillet, and then to the respective walls of the seam cleft, and thus into the body of the tube. Thus there is great concentration of current at the localized areas of contact between the welding roll and fillet, and between the latter and the walls of the cleft, creating a resistance which very rapidly raises the temperature of said parts to a fusing temperature. The clenched parts of the seam maintain positive mechanical union of the abutting tube portions, and insure the parts which are being fused and welded being retained in exact proper relation to each other. The fused metal derived from the fillet flows into the cleft of the seam and unites homogeneously with the walls of the cleft; the underlying interlocked parts of the seam maintaining the bottom of the cleft closed so that all of the fused metal is retained exactly where it should be. The result of the combined pressure of the welding roll and heat generated by the current is to cause a very perfect homogeneous and autogenous union of the parts and to produce tubing which is externally seamless.

The character of the work done by the apparatus is such that after a simple polishing operation it is usually impossible to detect the line of the seam by the naked eye. However, when we refer to the finished tube as externally seamless it is not thereby necessarily to be understood that no visible trace of the welding operation remains, but that the tube wall is, structurally considered, practically continuous and homogeneous. We have found that the process is perfectly adapted to the welding of tubing from steel stock as thin as 30 gage. In carrying on the welding of so-called steel tubing of light gage, a linear speed of approximately 45 feet a minute is readily attainable, with an expenditure of electric current of 6 to 18 kilowatts at from 2 to 3 volts pressure.

The finished tube is not merely externally seamless in appearance, but the portions abutting the original cleft line are so firmly joined as to be practically proof against relatively longitudinal displacement even when the tube is subjected to severe torsional strains or bending stresses.

It will thus be understood that we fully overcome the obstacles hereinbefore described as applying to the prior art, and fully accomplish the stated objects of the invention.

We have described what we consider to be a preferred method and mechanism of carrying out our invention. It should, however, be understood that many of the details of the invention may be modified without departing from the spirit or substance thereof.

An improved process of making thin-walled metal tubing, said process comprising forming a sheet metal blank into tubular form, uniting the adjoining edges thereof into an internal longitudinal plural-ply seam having an external seam cleft, and then closing the cleft by autogenous welding, the metal for closing the cleft being derived either wholly from the stock of the tube, or wholly or partly from an applied fillet or the like, is claimed broadly, together with the tube formed by the said process, in our copending application Serial No. 25,324, filed of even date herewith.

We claim—

1. The improved process of making thin-walled steel tubing, which comprises forming a sheet-steel blank into tubular form, uniting the adjacent edges thereof into an internal, longitudinal, plural-ply seam having an external seam-cleft, associating a fillet of essentially similar metal with said cleft, and heating the fillet and adjacent tube-portions to effect autogenous union between the walls of the cleft, whereby the tube portions abutting the union are firmly held against relative longitudinal displacement.

2. The improved process of making thin-walled steel tubing, which comprises forming a sheet-steel blank into tubular form, uniting the adjacent edges thereof into an internal, longitudinal, plural-ply seam having an external seam-cleft, associating a fillet of essentially similar metal with said cleft, and heating the fillet and adjacent tube-portions to effect autogenous union between the walls of the cleft, whereby an externally seamless tube is produced, and the tube-portions abutting the union are firmly held against relative longitudinal displacement.

3. The improved process of making thin-walled metal tubing, which comprises forming a sheet-metal blank into tubular form, uniting the adjacent edges thereof into an internal, longitudinal, plural-ply seam having an external seam-cleft, applying a fillet of essentially similar metal to said cleft, and progressively electrically heating the fillet and the adjacent tube-portions to effect autogenous union between the walls of the cleft, whereby an externally seamless tube is produced, and the tube-portions abutting the union are firmly held against relative longitudinal displacement.

4. The improved process of making thin-walled metal tubing, which consists in forming a sheet metal blank into tubular cross-section, uniting the longitudinal edges of said blank by a seam having an external seam-cleft or joint underlaid and closed by a ply of the seam-forming metal, and completing said union by applying a fillet of essentially similar metal alongside said seam-cleft and progressively fusing said fillet into autogenous union with the walls of said cleft.

5. The improved process of making thin-walled metal tubing, which consists in forming a sheet metal blank into tubular cross-section, uniting the longitudinal edges of said blank by folding the edges thereof inwardly upon themselves and applying internally a locking strip engaging said folded portions, and perfecting the exterior of the seam of the tube by applying a fillet of essentially similar metal along the external seam-cleft and progressively fusing said fillet into autogenous union with the walls of said cleft.

6. The improved process of making thin-walled metal tubing, which consists in forming a sheet metal blank into tubular cross-section and uniting the longitudinal edges thereof by a seam comprising plural plies or thicknesses of the edges of the tube blank, and perfecting said seam by applying a fillet of essentially similar metal along the external seam-cleft and progressively fusing said fillet, by passing electric current therethrough, into autogenous union with the walls of said cleft.

7. The improved process of making thin-walled metal tubing, which consists in first forming a sheet metal blank into tubular cross-section and mechanically seaming the longitudinal edges together, then, without disturbing said mechanical seam, applying a fillet of essentially similar metal along the seam-cleft and progressively fusing said fillet into autogenous union with the walls of said cleft by passing electric current through the fillet and contacting walls of the seam-cleft.

8. The improved process of making thin-walled metal tubing, which consists in forming a sheet metal blank into tubular cross-section, uniting the longitudinal edges of said blank by a mechanically formed seam and rendering the tube externally seamless by applying a fillet of essentially similar metal along the external seam-cleft and lying partly within the latter, bringing one electrode of an electric welding circuit into pressing engagement with said fillet, bringing the other electrodes, connected in multiple, into engagement with the respective sides of the tube, and simultaneously moving said tube longitudinally relatively to the electrodes and passing current therethrough, whereby said fillet and the walls of the seam-cleft are fused into substantially homogeneous union.

9. In an apparatus for welding lock-seam tubing, the combination of a yielding contact shoe embracing the tube, a welding roll adapted to contact with a part of the tube between the two sides of the contact shoe, means for guiding and centering the seam of the tube relatively to said welding-roll, means for guiding a fillet of metal into the seam-cleft of the tubing and beneath said welding-roll, means for establishing an electric circuit through said electrodes and the tube parts they engage, and means for simultaneously effecting relative movement of the tube with reference to said shoe and roll.

10. In an apparatus for welding lock-seam tubing, the combination of a welding roll and means for yieldably forcing said roll into contact with a part of the tube, means for guiding a length of tubing beneath said welding roll, one or more contact devices in addition to said welding roll, means for sending current through the welding roll into the tube engaged thereby and through the additional electrode or electrodes, and means for applying and welding a fillet of metal into a seam-cleft in the exterior of the tubing.

11. In an apparatus for welding lock-seam tubing, the combination of a divided spring-pressed contact shoe adapted to embrace the tube, a welding roll mounted to yieldably engage the upper side of the tube, a centering roll provided with a knife-edged rib adapted to engage the seam-cleft of the tube and center the latter relatively to the welding roll, means for guiding and pressing a fillet of metal into the seam-cleft of the tubing close in front of said welding roll, and means for establishing an electric circuit through said welding roll, through the fillet engaged thereby, the walls of the seam-cleft, and the divided contact shoe, substantially as described.

JOHN F. GAIL.
OTTO RUDD.

Witnesses:
GEO. B. KUEPPER,
J. FRANK LETEBRO.